Patented Oct. 25, 1932

1,884,629

UNITED STATES PATENT OFFICE

HENRY DREYFUS, OF LONDON, ENGLAND

TREATMENT OF CELLULOSE AND DERIVATIVES THEREOF

No Drawing. Application filed October 29, 1930, Serial No. 492,085, and in Great Britain November 20, 1929.

This invention relates to the manufacture of cellulose ethers and in particular to the manufacture of cellulose ethers containing carboxylic acid groups.

The treatment of alkalized cellulose with monochloracetic acid or its homologues is known. The products obtained by known processes, for example carboxy methyl cellulose or cellulose glycollic acid, are insoluble in organic solvents, for example alcohol, ether, acetone, or benzene, and are therefore of no practical value for the production of plastic masses or films or artificial filaments.

I have found that this is due to the fact that only one molecule of chloracetic acid or homologue thereof has been brought to reaction with one molecule of cellulose, calculated on the $C_6$ formula. I have further found that, by carrying out the etherification in presence of sufficient alkali to form a concentrated solution with the water present, products may be obtained in which two or more ether groups are introduced into the cellulose molecule, and which are soluble in organic solvents.

According to the present invention therefore, cellulose or cellulose containing material is etherified by treatment with monochloracetic acid or its homologues or other halogenated organic acids, preferably halogenated aliphatic acids, or their derivatives in presence of caustic alkali sufficient to form a concentrated solution with any water present, and particularly in presence of sufficient caustic alkali to form a solution of at least 45% concentration.

The most valuable results are obtained by employing the caustic alkali in sufficient quantity to form a saturated aqueous solution with the water present. This in the case of caustic soda at room temperature represents a concentration of about 50%. I have further found that it is still more advantageous to employ the caustic alkali in a proportion in excess of that which will dissolve in the water present. For example caustic soda may be present in a quantity exceeding three times the weight of the water.

The quantity of water present during the etherification is preferably less than four times the weight of the cellulose and may be as low as 1½ times to ½ its weight or less.

As initial materials for treatment according to the present invention any desired cellulosic materials may be employed, for example cotton cellulose or the near conversion products of cellulose or wood pulps, preferably wood pulps, such as sulphite pulp, soda pulp or sulphate pulp, from which the lignin, pentosan and resin constituents have been substantially removed.

The invention further contemplates the treatment of suitable cellulose derivatives containing free hydroxy groups, e. g. methyl, ethyl or other alkyl, oxyalkyl, aralkyl or carboxy alkyl derivatives of cellulose in which the cellulose is not fully etherified.

The cellulose may be kneaded with concentrated caustic alkali solution or may be first moistened with the desired amount of water and powdered caustic alkali kneaded in. The water may if desired be wholly or partly replaced by an alcohol in any desired quantity, for example ethyl alcohol, or an alcohol may be used in addition to the water; that is to say the invention while not contemplating the employment of caustic alkali in relatively dilute aqueous solution includes the case in which a concentrated aqueous solution is diluted with an alcohol or in which the alkali is employed in concentrated or dilute alcoholic solution. The mercerized cellulose may then be treated with monochloracetic acid which may be dissolved in a minimum of water or may be dissolved in another solvent, for example alcohol, benzene or toluene. Diluents such as alcohol, benzene and toluene may be present during the reaction in relatively large proportions compared with the cellulose, for example up to 10 times the weight of the cellulose or more. The mixture of the alkalized cellulose with monochloracetic acid may then be stirred or kneaded depending upon the quantity of liquid present for some hours or until the desired solubility of the free cellulose glycollic acid is produced. Preferably the reaction is carried out in two or more stages, either the caustic alkali or the chloracetic acid or both being added in stages. For example cellulose may in the first stage be kneaded with four molecular proportions of caustic soda and the product treated with two to three molecular proportions of chloracetic acid. A further four molecular proportions of caustic soda may then be kneaded in and the product again treated with two to three molecular proportions of chloracetic acid and the process continued if necessary until the cellulose has been substituted to the desired extent.

The chloracetic acid may of course be used in the form of a salt, for example the sodium or potassium salt, or in the form of an ester, for example ethyl chloracetate, or other derivatives. Or again other halogenated acids may be employed, e. g. chlorpropionic acid, chlormalonic acid, chlorsuccinic acid or their homologues so as to obtain the cellulose ethers of the corresponding hydroxy acids, e. g. cellulose lactic acid or cellulose tartronic acid. The etherification may moreover be conducted in presence of substances adapted to bind water by chemical reaction, for example lime or other substances referred to in my U. S. Patent No. 1,542,541. Furthermore the etherification may be carried out in the presence of catalysts, e. g. copper powder, copper salts or hydroxides.

If desired the carboxylic acid groups may be esterified, for example by treating the sodium or other salt of the cellulose glycollic acid or like cellulose derivative with an alkyl chloride or other alkyl halide, a dialkyl sulphate or an aralkyl halide. As previously indicated the products may be dissolved in organic solvents and are therefore utilizable for the purposes to which cellulose derivatives have previously been applied. For example they may be employed for the production of plastic masses, moulded articles, films or artificial filaments, ribbons or the like. They may further be employed as sizes for finishing agents for textile yarns or fabrics; in coating compositions, as protective colloids in the production of colloidal solutions or dispersions of insoluble liquids or solids and as thickening agents in textile printing. For the latter purpose their compatibility with organic solvents is valuable since in modern practice it is common to incorporate in the printing paste organic liquids, for example acetic acid, chloracetic acid, ethylene glycol, ethylene chlorhydrin, ethylene thiodiglycol and the like. Moreover in the printing of materials made of or containing cellulose acetate or other organic derivatives of cellulose, organic solvents are customarily incorporated in the printing paste for the purpose of swelling the cellulose derivative (compare U. S. application S. No. 43,420, filed 13th July, 1925). In the manufacture of plastics, films and artificial filaments and the like the new cellulose derivatives are most valuable when used in conjunction with cellulose acetate or other relatively water resistant organic substitution derivatives of cellulose. They may for example be used in a proportion of 10 to 100% of the weight of the cellulose acetate or like cellulose derivative.

By this means it is found that the plastic masses, artificial filaments or other products have an increased moisture regain, the filaments, yarns etc. being thus made more amenable to textile operations, such as knitting, pirning, twisting etc., while in the manufacture of plastic masses the increased moisture regain appears to result in a kind of conditioning of the plastic with improved properties in the product.

The following examples show the best methods known to me for carrying the invention into effect but they are not to be considered as limiting it in any way:—

*Example 1*

162 parts of cellulose, for example cotton or purified wood pulp, are treated with 300 parts of 50% caustic soda solution and the whole kneaded together for about 2 hours in a kneading machine. During this period a further 180 parts of powdered caustic soda are kneaded in and at the end of the operation 200 parts of chloracetic acid are introduced gradually, the temperature being maintained at between ordinary temperature and about 35 to 40° C. After about 6 hours further quantities of caustic soda and chloracetic acid are worked in, for example a further 250 parts of caustic soda and a further 200 to 300 parts of chloracetic acid. After about 6 hours the product may be separated or may be treated with a further quantity of powdered caustic soda and a further quantity of chloracetic acid, for example quantities similar to those already mentioned. During this last stage of the etherification the temperature may be allowed to rise somewhat, for example up to 50 to 55° C. On addition of water to the reaction product the cellulose glycollic acid obtained goes into solution and may be separated therefrom by addition of a mixture of aqueous hydrochloric acid and alcohol. The precipitated product may then be washed cautiously with hot aqueous alcohol.

The cellulose glycollic acid thus obtained is soluble in dilute alkali in the cold and is soluble in acetone containing or not containing water, in acetic acid, formic acid and chloracetic acid.

*Example 2*

162 parts of cellulose, for example cotton or purified wood pulp, are treated with 300 to 350 parts of 50% caustic soda solution and the whole well kneaded. 150 to 300 parts of quick lime together with 100 parts of powdered caustic soda are then worked into the mass, preferably in presence of benzene or other diluent, for example in a quantity of 500 to 1,000 parts, the operation being preferably carried out under strong cooling. At this stage 300 to 400 parts of chloracetic acid are added to the mass gradually and the whole stirred or kneaded from time to time preferably with sufficient cooling, if required, so that the etherification is effected at about ordinary temperature. A second stage etherification and if desired a third stage are then conducted as described in Example 1. The product after separation from the benzene is acidified with a relatively dilute solution of hydrochloric acid containing 200 to 400 parts of hydrogen chloride, preferably hot, and the liquor then expressed from the mass. After this the cellulose glycollic acid is dissolved in water and isolated as described in Example 1. It has similar properties to the product manufactured according to Example 1.

*Example 3*

To the product of Example 1 or 2 are added 200 to 300 parts of 50% caustic soda solution and in addition 80 to 100 parts of powdered caustic soda are worked in, after which 500 parts of dimethyl sulphate are added gradually and the whole kneaded from time to time. In this way an almost complete esterification of the carboxy groups of the cellulose glycollic acid may be effected. A further esterification step may be effected by adding an additional 80 to 100 parts of powdered caustic soda together with 200 to 300 parts of dimethyl sulphate. The cellulose glycollic acid methyl ester thus produced may be washed thoroughly with water to remove by-products and excess reagents used and may then be dissolved in any suitable organic solvents, for example acetone, acetic acid or chloracetic acid.

In the specification and claims, the expression "halogenated aliphatic acid" includes not only the halogenated aliphatic acids themselves but also their esters and salts.

What I claim and desire to secure by Letters Patent is:—

1. The manufacture of cellulose ethers of hydroxy carboxylic acids, which ethers are soluble in organic solvents, comprising effecting etherification of cellulose with sufficient halogenated aliphatic acid to introduce substantially more than one ether group into the cellulose molecule in presence of sufficient caustic alkali to form a concentrated solution with any water present.

2. The manufacture of cellulose ethers of hydroxy carboxylic acids, which ethers are soluble in organic solvents, comprising effecting etherification of cellulose with sufficient halogenated aliphatic acid to introduce substantially more than one ether group into the cellulose molecule in presence of caustic alkali in sufficient quantity to form with any water present a solution of at least 45% concentration.

3. The manufacture of cellulose ethers of hydroxy carboxylic acids, which ethers are soluble in organic solvents, comprising effecting etherification of cellulose with sufficient halogenated aliphatic acid to introduce substantially more than one ether group into the cellulose molecule in presence of sufficient caustic alkali to form a saturated solution with any water present.

4. The manufacture of cellulose ethers of hydroxy carboxylic acids, which ethers are soluble in organic solvents, comprising effecting etherification of cellulose with sufficient halogenated aliphatic acid to introduce substantially more than one ether group into the cellulose molecule in presence of a quantity of caustic alkali exceeding three times the weight of any water present.

5. The manufacture of cellulose ethers of hydroxy carboxylic acids, which ethers are soluble in organic solvents, comprising effecting etherification of cellulose with sufficient chloracetic acid to introduce substantially more than one ether group into the cellulose molecule in presence of sufficient caustic alkali to form a concentrated solution with any water present.

6. The manufacture of cellulose ethers of hydroxy carboxylic acids, which ethers are soluble in oganic solvents, comprising effecting etherification of cellulose with sufficient chloracetic acid to introduce substantially more than one ether group into the cellulose molecule in presence of caustic alkali in sufficient quantity to form with any water present a solution of at least 45% concentration.

7. The manufacture of cellulose ethers of hydroxy carboxylic acids, which ethers are soluble in organic solvents, comprising effecting etherification of cellulose with sufficient chloracetic acid to introduce substantially more than one ether group into the cellulose molecule in presence of sufficient caustic alkali to form a saturated solution with any water present.

8. The manufacture of cellulose ethers of hydroxy carboxylic acids, which ethers are soluble in organic solvents, comprising effecting etherification of cellulose with sufficient chloracetic acid to introduce substantially more than one ether group into the cellulose molecule in presence of a quantity of caustic alkali exceeding three times the weight of any water present.

9. Cellulose ethers of hydroxy aliphatic acids, soluble in organic solvents and containing not substantially less than two ether groups per cellulose molecule.

10. Cellulose ethers of glycollic acid, soluble in organic solvents and containing not substantially less than two glycollyl radicles per cellulose molecule.

In testimony whereof I have hereunto subscribed my name.

HENRY DREYFUS.